United States Patent [19]

Wilhelmi

[11] 4,369,438

[45] Jan. 18, 1983

[54] SUMP PUMP DETECTION AND ALARM SYSTEM

[76] Inventor: Joseph R. Wilhelmi, 3131 September Dr., Joliet, Ill. 60435

[21] Appl. No.: 149,382

[22] Filed: May 13, 1980

[51] Int. Cl.[3] .................. G08B 19/00; G08B 1/08; H04Q 7/00
[52] U.S. Cl. ............................. 340/623; 340/521; 340/533; 340/539; 340/663
[58] Field of Search ............ 340/663, 531, 620, 624, 340/625, 616, 623, 539, 309.1, 521, 533

[56] References Cited

U.S. PATENT DOCUMENTS

| | | | |
|---|---|---|---|
| 1,216,678 | 2/1917 | Ford | 340/624 X |
| 3,310,795 | 3/1967 | David | 340/624 X |
| 3,430,218 | 2/1969 | Healey | 340/533 X |
| 3,787,624 | 1/1974 | Spitalny et al. | 340/533 X |
| 3,800,091 | 3/1974 | Glidden et al. | 340/533 X |
| 3,932,853 | 1/1976 | Cannon | 340/625 X |
| 4,080,985 | 3/1978 | Eagle | 340/624 X |
| 4,228,427 | 10/1980 | Niedermeyer | 340/663 X |

Primary Examiner—John W. Caldwell, Sr.
Assistant Examiner—Daniel Myer
Attorney, Agent, or Firm—Ernest S. Kettelson

[57] ABSTRACT

A sump pump detection and alarm system, comprising electrical circuits and components to detect the existence of three different conditions, namely (1) a high water condition with electric power still available, (2) a high water condition when electrical power has failed, and (3) a failure of electrical power to the sump pump even though there is no high water level at the time, and to energize an alarm when detected to indicate which of the three conditions exists. The invention includes remote alarm stations, and in addition connections to the on-premises telephone line to produce a busy signal or other signal when such number is dialed in the event one of the three sump pump conditions exists, plus connections to a radio transmitter to transmit a radio signal when one of the said conditions exist.

42 Claims, 7 Drawing Figures

SUMP PUMP DETECTION AND ALARM SYSTEM

BACKGROUND OF THE INVENTION

This invention relates to a sump pump detection and alarm system to indicate one or more abnormal conditions at the site of the pump to enable corrective measures to be taken before damage is done.

There are a number of prior art devices which detect the presence of water at an overflow or high water level, having a relay or switch which is actuated by a float reaching such level to then energize an alarm circuit. However, at such time the sump pump may be working normally at full capacity, and the overflow condition may be only temporary. Conversely, a condition might prevail at the sump pump site in which electrical power has failed, but at the time there is no overflow or high water condition. It can be just as important to be warned of that condition, so corrective measures can be taken before a high water level condition occurs.

The present invention overcomes such problems by providing an alarm system which detects and distinguishes between three different conditions, namely (1) a high water condition when electric power is still available, (2) a high water condition and electric power has failed at the pump site, and (3) a failure of electrical power to the pump at a time when no high water condition is present. Other features and advantages of the present invention will become apparent from the detailed description which follows.

SUMMARY OF THE INVENTION

It is an object of the invention to provide a sump pump alarm system which is able to detect and distinguish between a plurality of different abnormal conditions at the sump pump site, and to energize an alarm upon the occurrence of such conditions.

It is an object of the invention to provide a sump pump alarm comprising an electrical circuit and components to detect and signal the presence of a high water-no power condition, a high water-power available condition, and a no power-no high water condition at the pump site, providing a different signal to indicate the presence of each condition.

It is an object of the invention to provide a sump pump alarm system comprising an electrical circuit and components to detect and signal the presence of abnormal conditions at the pump site, and remote alarm stations for placement at locations remote from the sump pump site.

It is an object of the invention to provide a sump pump alarm system comprising an electrical circuit and components to detect the presence of an abnormal condition at the pump site, and to impinge a signal on an incoming telephone line to indicate the presence of such abnormal condition.

It is an object of the invention to provide a sump pump alarm system comprising an electrical circuit and components to detect the presence of an abnormal condition at the pump site, and to feed a signal of such abnormal condition to a radio transmitter for transmission of such signal by radio waves.

DESCRIPTION OF THE PREFERRED EMBODIMENT

Figure 1:
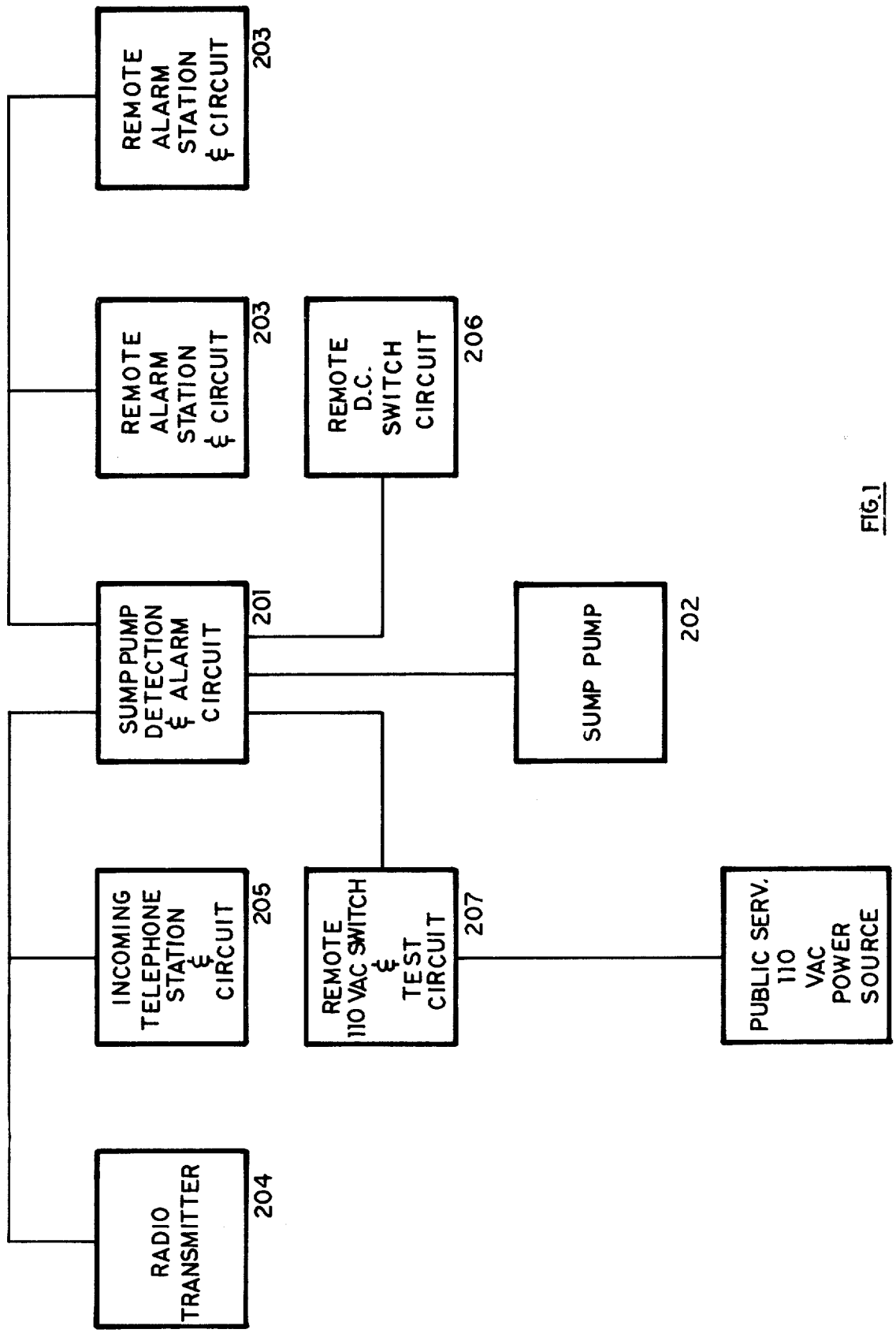
FIG. 1 is a block diagram of the sump pump alarm system in accordance with this invention.
Figure 2:
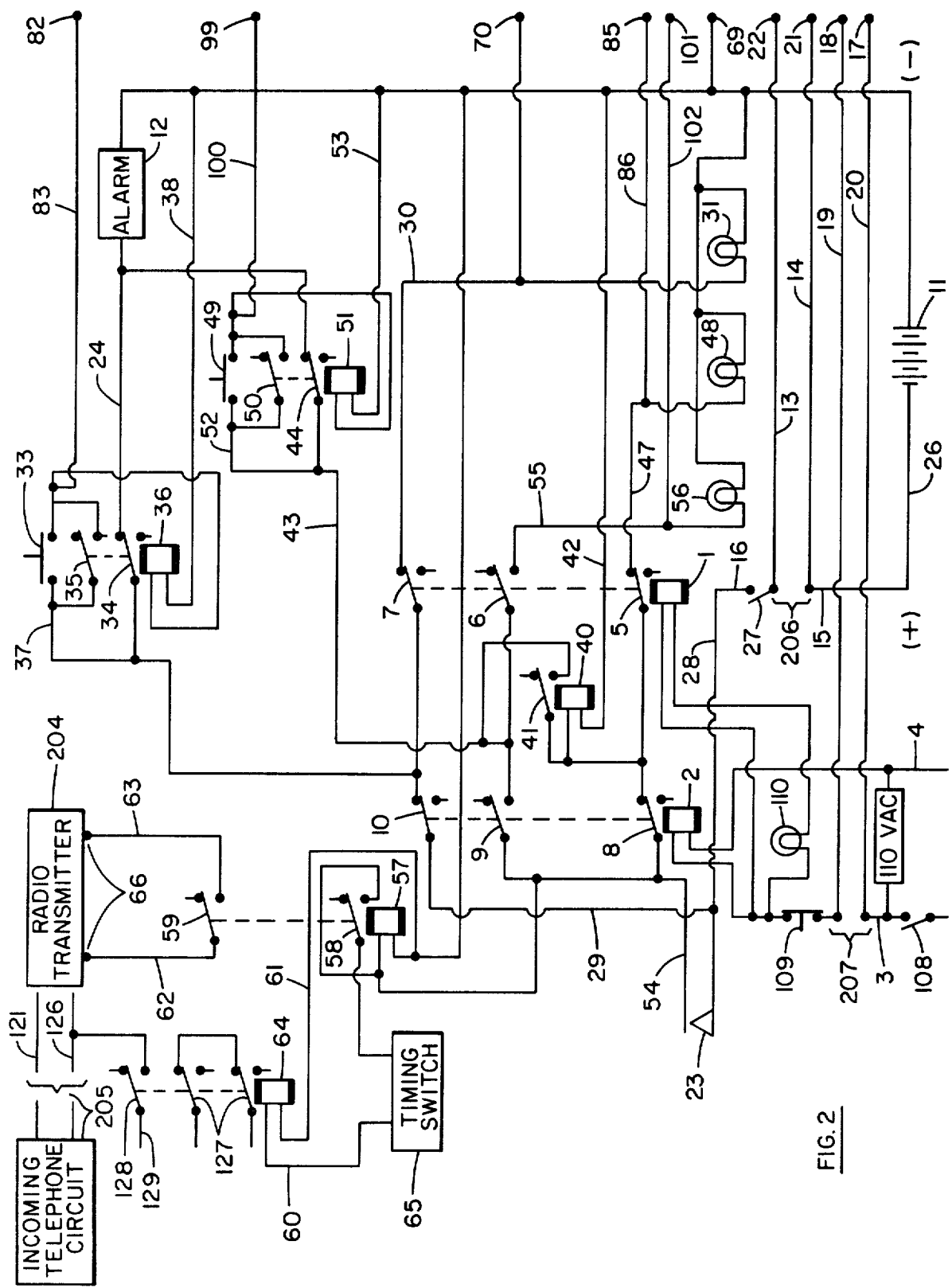
FIG. 2 is a schematic showing the detection and alarm circuits of the sump pump alarm in accordance with this invention.

A sump pump detection and alarm system in accordance with this invention includes a detection and alarm circuit 201 in detect and signal the presence of a plurality of abnormal conditions at the site of an electrical sump pump 202 located in the basement or lowest floor of a building for the purpose of pumping out water which enters and flows to the site of the pump.

The abnormal conditions detected include (1) a high water condition with electric power still available, (2) a high water condition when electrical power to the sump pump has failed, and (3) a failure of electrical power even though there is no high water condition at the time.

A signal may also be transmitted to a radio transmitter 204 and to the circuit of a telephone receiving station 205 located at the premises where the sump pump 202 is located.

The detection and alarm circuit 201 is electrically connected to a public service 110 Volt A.C. source by means of a pair of relay coils 1 and 2 which are connected across the 110 Volt conductors 3 and 4. Coil 1 operates relay contacts 5, 6 and 7 and coil 2 operates relay contacts 8, 9 and 10 in a manner described subsequently herein.

The detection and alarm circuit 201 is powered by a battery 11 and includes an alarm device 12 which may be a buzzer, bell, horn or other device which emits an audible source when energized.

A remote D.C. switching circuit 206 is connected across the detection and alarm circuit 201 by means of conductors 13 and 14 leading from their respective connections to conductors 15 and 16 of the detection and alarm circuit 201 to terminals 17 and 18 of the remote D.C. switching circuit 206. The purpose of this circuit 206 is to open and close the connection of circuit 201 to the battery 11 or D.C. power source.

A remote A.C. switching and testing circuit 207 is connected across the 110 Volt conductor 3 of the main A.C. power line source by means of conductors 19 and 20 which lead to terminals 21 and 22 of the A.C. switching and testing circuit 207. The purpose of circuit 207 is to connect and disconnect the detection and alarm circuit 201 and the relay coils 1 and 2 from the main line A.C. power source, as well as to test the operation of the D.C. detection and alarm circuit 201 from a remote location.

The circuit for a loss of power but no high water condition will be described first. While 110 Volt A.C. power is available to the sump pump 202, the relay coil 2 is energized and its corresponding relay contacts 8 are held in the contact open position, relay contacts 9 are held in the contact closed position, and relay contacts 10 are held in the contact open position. When 110 Volt A.C. power fails, the relay contacts 8, 9 and 10 are biased to their respective opposite positions so that relay contacts 8 close, relay contacts 9 open and relay contact 10 closes.

At this time, since there is no high water level at the sump pump 202, a limit switch 23 connected to the float of the sump pump is open.

The relay coil 1 when energized by the 110 Volt A.C. main line power source holds its corresponding relay contacts in the following positions, contacts 5 open, contacts 6 closed and contacts 7 open. When loss of 110 Volt A.C. power occurs, these relay contacts 5, 6 and 7 are biased to their respective opposite positions so that contacts 5 close, contacts 6 open and contacts 7 close.

The only completed circuit at this time, loss of 110 Volt A.C. power but no high water at the sump pump location, between the battery 11 and the alarm 12 is therefore through closed contacts 10, conductor 24 leading to the alarm 12, conductor 25 leading to the battery 11, conductors 26 leading to conductor 15 of the remote D.C. switching circuit 206, through toggle switch 27, conductors 28 and 29 back to the closed relay contacts 10. At this time a circuit is also completed through closed relay contacts 7 and conductor 30 to a signal lamp 31 mounted on the control console 32 for the detection and alarm circuit 201 to signal at that location that a loss of 110 Volt A.C. power condition exists but without an accompanying high water level condition at the sump pump site.

The alarm 12 may be turned off or de-energized by a push button 33 mounted on the console 32 for circuit 201 which closes switch 34 which is in parallel with normally open relay contacts 35 associated with relay coil 36. When switch 34 is closed, relay coil 36 is energized moving its relay contacts 35 to the closed position to provide a holding circuit across conductors 37 and 38 thereby shorting out the alarm 12. The signal lamp 31 remains energized and lit until the toggle switch 27 is opened, or until the remote D.C. switching circuit 206 is opened, to break the circuit between the battery 11 and the signal lamp 31.

The circuit for a loss of 110 Volt A.C. power condition with a high water condition at the sump pump site will be described next. With loss of 110 Volt A.C. power, the relay contacts 8, 9 an 10 associated with relay coil 2 and relay contacts 5, 6 and 7 associated with relay coil 1 will be in the same positions as described above for a loss of power-no high water condition. Thus, relay contacts 8 and 5 will be in the closed contact position.

In addition, the limit switch 23 will be in the closed position as a result of a high water level at the sump pump site.

The completed circuit at this time between the battery 11 and the alarm 12 is through limit switch 23, closed relay contact 8, conductor 39 leading to relay coil 40 and its associated normally open relay contact 41. This relay coil 40 is connected across the battery 11 through conductors 42 and 25 on one side and to the limit switch 23 connection to battery 11 on the other side. It therefore becomes energized when limit switch 23 closes, thereby moving its associated normally open relay contacts 41 to the closed contact position and completing a circuit through conductor 43 and a normally closed relay contact 44 to the alarm 12, then conductor 25 to battery 11 and back to limit switch 31 through closed toggle switch 27 and remote switching circuit 206. At this time a circuit is also completed through closed relay contact 5 and conductor 47 to energize signal lamp 48 mounted on the control console 32 for the detection and alarm circuit 201 to signal at that location that a loss of 110 Volt A.C. power condition exists and that a high water level condition also exists at the sump pump site.

The alarm 12 may be turned off or de-energized in this mode by the push button 33 mounted on the console 32 for circuit 201 which closes switch contact 49 which is in parallel with normally open relay contacts 50 associated with relay coil 51. When contact 49 is closed, relay coil 51 is energized moving its normally open relay contacts 50 to the contact closed position to provide a holding circuit across conductors 52 and 53 thereby shorting out the alarm 12. The signal lamp 48 remains energized and lit until the toggle switch 27 is opened, or until the remote D.C. switching circuit 206 is opened, to break the circuit between the battery and signal lamp 48.

The circuit for a high water level condition at the sump pump site but with no loss of 110 Volt A.C. power will now be described. With 110 Volt A.C. power available, relay coils 2 and 1 will be energized and their corresponding relay contacts will be in the following positions: Contacts 8 open, contacts 9 closed, contacts 10 open, contacts 5 open, contacts 6 closed, contacts 7 open.

The limit switch 23 will be in the closed position.

The completed circuit at this time between the alarm 12 and battery 11 is through limit switch 23, conductor 54 leading to relay contact 9 and is now in the contact closed position, through conductor 43 and the normally closed relay contact 44 to the alarm 12, then conductor 25 to battery 11 and back to limit switch 23 through closed toggle switch 27 and remote switching circuit 206.

At this time, a circuit is also completed through relay contacts 6 which are now in the contact closed position since relay coil 1 is energized, such circuit leading through conductor 55 to energize signal lamp 56 mounted on the control console 32 for the detection and alarm circuit 201 to signal at that location that a high water level condition exists at the sump pump site but that 110 Volt A.C. power is still available to the sump pump 202.

The alarm 12 may be de-energized in this mode by depressing the push button 33 on the console 32 for circuit 201 which closes contact 49 with the same effect as described above for the high water-no power mode. The signal lamp 56 remains energized or lit until either the toggle switch 27 or remote D.C. switching circuit 206 is opened to break the circuit between the battery and signal lamp 56.

A relay comprising relay coil 57 and associated pairs of relay contacts 58 and 59 are connected across the battery 11 by connections to conductor 54 on one side and to conductor 25 on the other side to energize the radio transmitter 204 and the incoming telephone circuit 205. Relay contacts 50 are connected through conductors 60 and 61 to the incoming telephone circuit 205, and relay contacts 59 are connected through conductors 62 and 63 to the radio transmitter 204.

When a high water level condition exists at the sump pump site, limit switch 23 closes to complete a circuit to the battery 11 as previously described. Since relay coil 57 is connected across the battery 11 through its connection to conductor 54 leading to the limit switch 23 it becomes energized when a high water at the sump pump condition exists to move limit switch 23 to the closed contact position. The normally open relay contacts 58 are then moved to the contact closed position, thus completing a circuit through conductor 60 to relay coil 64 electrically connected to the incoming telephone circuit 205 which operates the telephone incoming call circuit in the same manner as if the handset were removed from the telephone receiver. The result is therefor to provide a busy signal at the incoming telephone circuit 205 for anyone attempting to reach that number. A timing switch 65 is provided to periodically open the circuit through conductor 60 after pre-determined time intervals, such as each two minutes, to remain in the circuit open position for a predetermined time such as thirty second, and then return to the circuit closed position for another two-minute interval. In this way, a person dialing such number who gets a busy signal, can wait up to thirty seconds before re-dialing one, two and no more than three times. During one of such re-dials, the phone should ring if the busy signal had been the result of relay contacts 58 being closed and timing switch 65 likewise being closed for the two-minute interval in the example given. In this way, the person dialing would know that the busy signal indicated a high water condition at the pump site.

In similar fashion, the normally open contacts 59 leading to the radio transmitter 204 are moved to the contact closed position when relay coil 57 becomes energized as a result of limit switch 23 closing because of a high water condition at the sump pump site. A circuit is then completed to terminal 66 of the radio transmitter 204, thereby turning the radio transmitter on to transmit a desired pre-determined signal such as a beeper signal on a pre-determined wave length.

Figure 3:
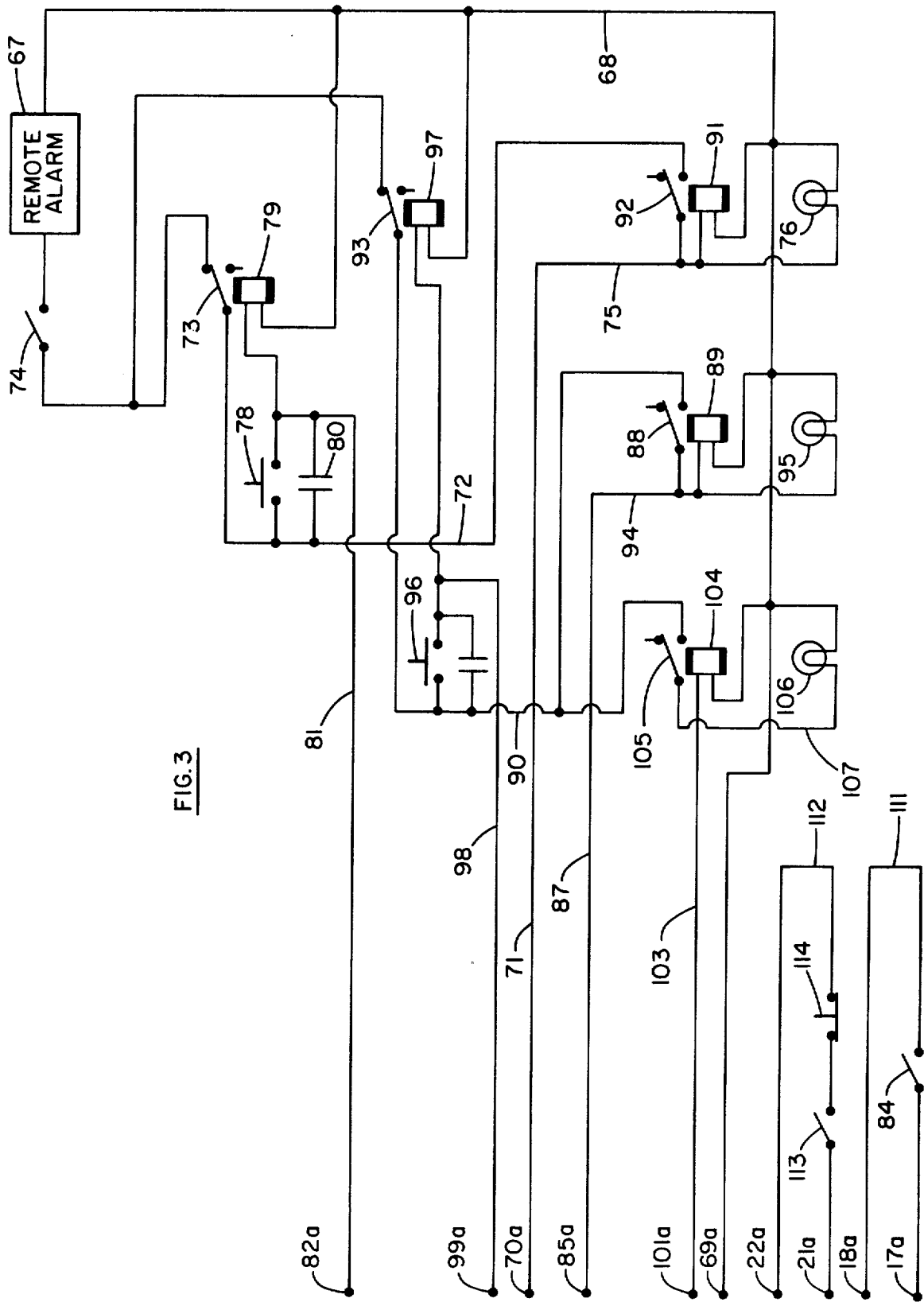
FIG. 3 is a schematic showing a remote alarm station circuit in accordance with this invention.
Figure 4:
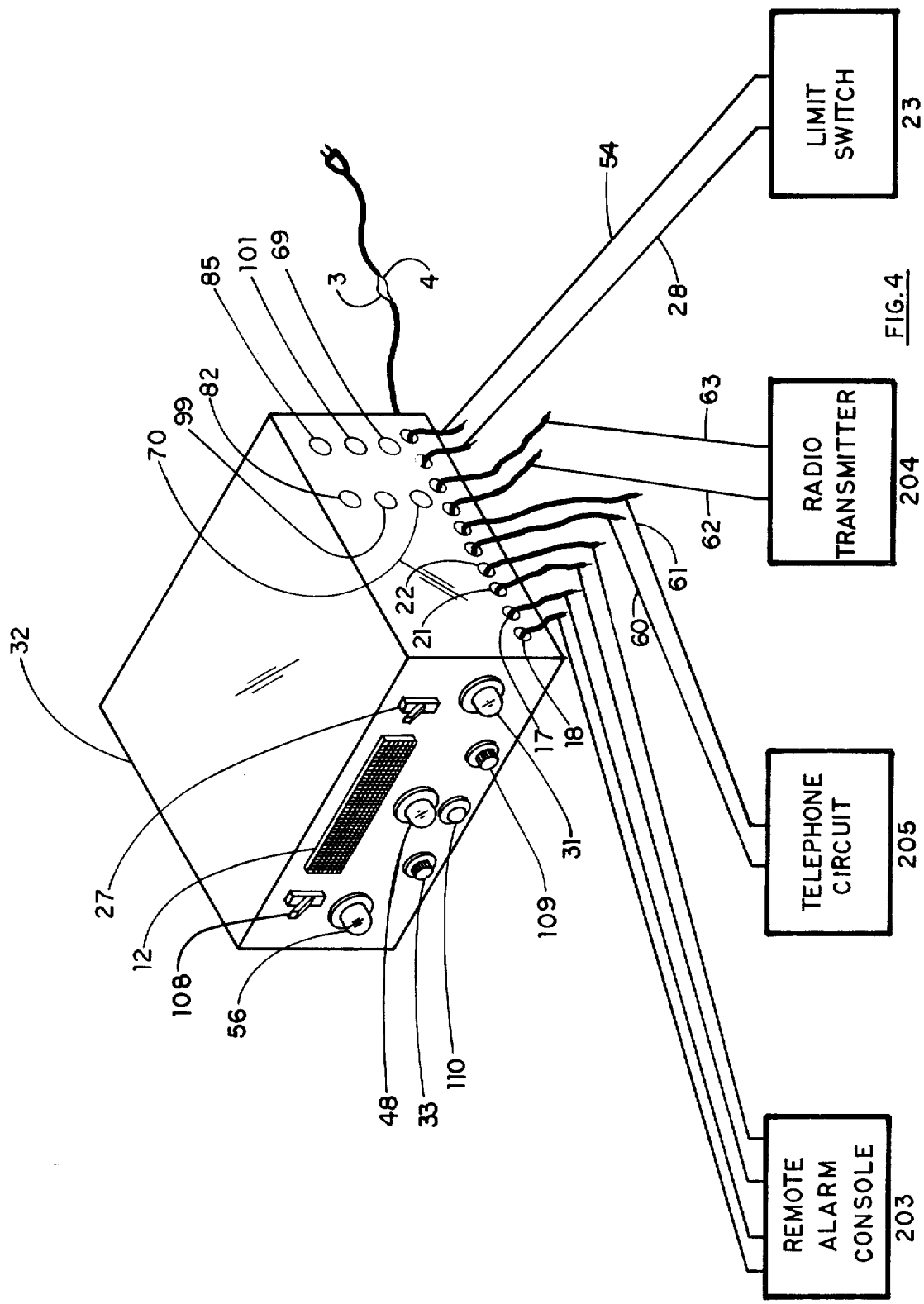
FIG. 4 is a perspective view of the primary control and monitoring console in accordance with this invention.
Figure 5:
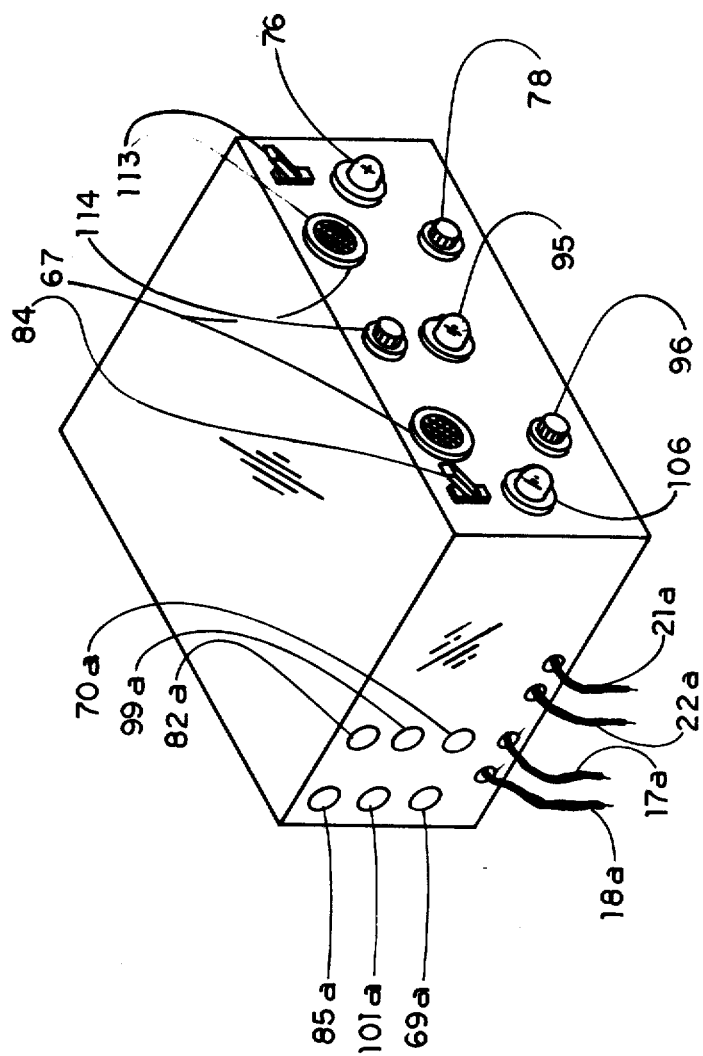
FIG. 5 is a perspective view of a remote alarm station console in accordance with this invention.

Remote alarm stations 203 may also be provided one of which is shown schematically in FIG. 3. A remote audible alarm device 67 is mounted in a room or building at some distance from the site where the sump pump 202 is located. The remote alarm 67 is connected on one side by a conductor 68 to a terminal 69a connected in turn to the negative terminal of the battery 11. On the other side, the remote alarm 67 is connected to the detection and alarm circuit 201 as described below for each condition.

For the condition of loss of 110 VAC power to the sump pump 202, but no high water level condition, a circuit to remote alarm 67 is provided through terminal 70 of the circuit 201 console and 70a of remote alarm console 77, to which is connected conductor 71 leading to relay 91, through corresponding normally open contacts 92 which are now closed, to conductor 72, through normally closed relay contacts 73 through closed toggle switch 74, to the remote alarm 67. At the same time, a circuit is completed from conductor 71 through conductor 75 to remote signal lamp 76 mounted on console 77 at the remote location to signal at that location that a loss of 110 VAC power condition but no high water level exists at the sump pump site.

The alarms at both the remote location and at the main console location may be de-energized or turned off at the remote location, that is both main alarm 12 and remote alarm 67. To do this, a push button switch 78 on the remote console is pushed to the circuit closed position which completes a circuit through relay coil 79 causing normally open contacts 80 in parallel with switch 78 to close and provide a holding circuit between conductors 68 and 72 thereby shorting out the remote alarm 67. At the same time a circuit is completed through conductor 81 to terminal 82a of remote console 77 and terminal 82 of the main console 32 of circuit 201. Conductor 83 of the main circuit 201 leads inside of the main console from terminal 82 to the junction between the main circuit de-energizing switch 34 and coil 36, which upon receiving the electrical signal on conductor 83 from terminal 82 connected to the remote station de-energizing circuit responds in the same manner as described above when the de-energizing push button is pushed to close switch 34 and short out the main alarm 12. The remote signal lamp 76 may be de-energized by opening toggle switch 84. Opening of toggle switch 84 will also de-energize the corresponding signal lamp 31 of the main detection and alarm circuit 201.

For the condition of loss of 110 VAC power to the sump pump 202, combined with a high water level at that location, a circuit to remote alarm 67 is provided through terminal 85 by conductor 86 of the circuit 201 console to which is connected conductor 87 leading from terminal 85a of remote console 77 to normally open relay contacts 88 and corresponding relay coil 89 which becomes energized to thereupon close relay contacts 88, the circuit then leading through conductor 90 to normally closed relay contacts 93, to the remote alarm 67 through closed toggle switch 74.

A circuit is also completed at this time through conductor 94 to signal lamp 95 mounted on the remote control console 77, which becomes energized to signal the existence of a combined loss of 110 VAC power plus high water level condition at the sump pump site.

The remote alarm 67 may be turned off in this mode by closing push button switch 96 on the remote control console 77 which completes a circuit across the remote alarm 67 between conductor 68 and 90 thereby energizing relay coil 97 to open normally closed relay contacts 93 and interrupting the circuit to the remote alarm 67. A circuit is also completed through conductor 98 to terminal 99a on remote console 77 and terminal 99 on the main circuit 201 console 32, to which conductor 100 of the main detector and alarm circuit 201 is also connected thereby completing a circuit to the junction between main circuit push button switch 49 and relay coil 51. The main alarm 12 is thereby also turned off in the same manner as described above with reference to the loss of power-high water mode. The remote signal lamp 95 may be turned off by opening toggle switch 84 on the remote console. If toggle switch 84 is opened, the corresponding signal lamp 48 on the main console for circuit 201 will be de-energized also.

For the third condition of high water level at the sump pump site, but no loss of power, a circuit is provided to remote alarm 67 through terminal 101 of the circuit 201 console by conductor 102 leading from conductor 55. Conductor 103 leads from terminal 101a of the remote alarm console 77 and to relay coil 104 with its associated relay contacts 105 which are biased to the normally open position. When energized by a signal on terminal 101a indicating the presence of a high water condition at the sump pump site but no loss of 110 VAC power, relay coil 104 causes the normally open relay contacts 105 to close thereby completing a circuit through conductor 90, normally closed relay contacts 93, through closed toggle switch 74 to the remote alarm 67.

At the same time, a circuit is completed to the remote signal lamp 106 through conductor 107 to indicate at the remote location that there is a high water level condition at the sump pump but no loss of 110 VAC power.

The remote alarm 67 may be de-energized in this mode by push button 96 being closed which energized relay coil 97 to open relay contacts 93 and interrupt the circuit to the remote alarm 67. A circuit is also completed at the same time to terminal 99 on the main circuit console 32 as described above with reference to the high water plus loss of 110 VAC power mode, thereby de-energizing the main alarm 12.

The remote signal lamp 106 and corresponding main signal lamp 56 may be turned off in the same manner respectively as described above for the other signal lamps.

An additional toggle switch 108 may be provided in conductor 3 leading to the main 110 VAC power line to shut off power from the main line when the detector and alarm is not in use.

A push-to-test button switch 109 is provided in conductor 3 leading from the main 110 VAC power source to test the operation of the main D.C. detection and alarm circuit 201 prior to use, and in particular to test the functioning of the circuit on occurrence of a loss of 110 VAC power condition. When switch 109 is pushed to open the circuit causing relay coils 1 and 2 to become de-energized, the alarm 12 should sound and signal lamp 31 should light if the circuit is working properly.

A signal lamp 110 is connected across the 110 VAC conductors 3 and 4 to provide a positive visual signal that power is available at the 110 VAC power line source. If signal lamp 110 is out, indicating loss of 110 VAC power, signal lamp 31 should be on. However, if signal lamp 31 were burned out, or if there were some defect in the main D.C. detection and alarm circuit, the signal lamp 31 may not be lit and the audible alarm 12 may not sound, even though there was a loss of 110 VAC power. Thus, signal lamp 110 provides a positive indication that 110 VAC power is available, and a double check to signal visually that 110 VAC power has failed if and when such condition does occur.

The toggle switch 84 in the remote D.C. switching circuit 206 is mounted on the remote control console 77. It is connected to interrupt and to complete a circuit in conductor loop 111 of remote switching circuit 206 which terminates at the exterior panel of remote control console 77 in terminals 17a and 18a. Terminals 17a and 18a of the remote control consoles 77 are connected respectively to terminals 17 and 18 of the main control console 32. When toggle switch 84 is moved to the open circuit position, the D.C. detection and alarm circuit 201 is disconnected from its D.C. battery source 11.

The remote A.C. switching and testing circuit 207 includes a conductor loop 112 mounted in the remote control consoles 77, and a toggle switch 113 mounted on the control panel of such consoles 77. The toggle switch 113 is connected in conductor loop 112 to interrupt and to complete a circuit therein when moved from one switching position to the other. When moved to the circuit open position, the connection of the entire system to the 110 VAC power source is interrupted. The conductor loop 112 terminates at the exterior panel of remote control console 77 in terminals 21a and 22a. The terminals 21a and 22a of the remote control consoles 77 are connected respectively to the terminals 21 and 22 of the main control console 32.

The other connections of remote control console 77 and the remote alarm circuit 203 to the main control console 32 are as follows:

| Terminals on Remote Control Console 77 | | Terminals on Main Control Console 32 |
|---|---|---|
| Terminal 82a | to | Terminal 82 |
| Terminal 99a | to | Terminal 99 |
| Terminal 70a | to | Terminal 70 |
| Terminal 85a | to | Terminal 85 |
| Terminal 101a | to | Terminal 101 |
| Terminal 69a | to | Terminal 69 |

The respective terminals on the remote control console 77 are connected as follows to conductors of the remote alarm circuit 203:

| Terminals | | Conductors |
|---|---|---|
| Terminal 82a | to | Conductor 81 |
| Terminal 99a | to | Conductor 98 |
| Terminal 70a | to | Conductor 71 |
| Terminal 85a | to | Conductor 87 |
| Terminal 101a | to | Conductor 103 |
| Terminal 69a | to | Conductor 68 |

A remote push-to-test button and switch 114 is provided on the remote control console 77, the switch 114 being connected in conductor loop 112. When push-to-test button 114 is pushed, the conductor loop 112 is opened thereby interrupting the circuit connection of the system to the 110 VAC power source which simulates a loss of power condition at the sump pump site. In such event, the main alarm 12 and remote alarms 67 should sound and signal lamp 31 on the main console 32 as well as signal lamp 76 on the remote consoles 77 should light. If they do, this means that the system is working properly and the push-to-test button can be released thereby re-completing the circuit in conductor loop 112 causing the alarms and signal lamps to be de-energized or "turned off." This occurs because power is again available to relay coils 1 and 2, which when energized open contacts 7 and 10 respectively thereby interrupting the circuits to the battery source 11 of the alarms 12 and 67 as well as of the signal lamps 31 and 76.

Figure 6:
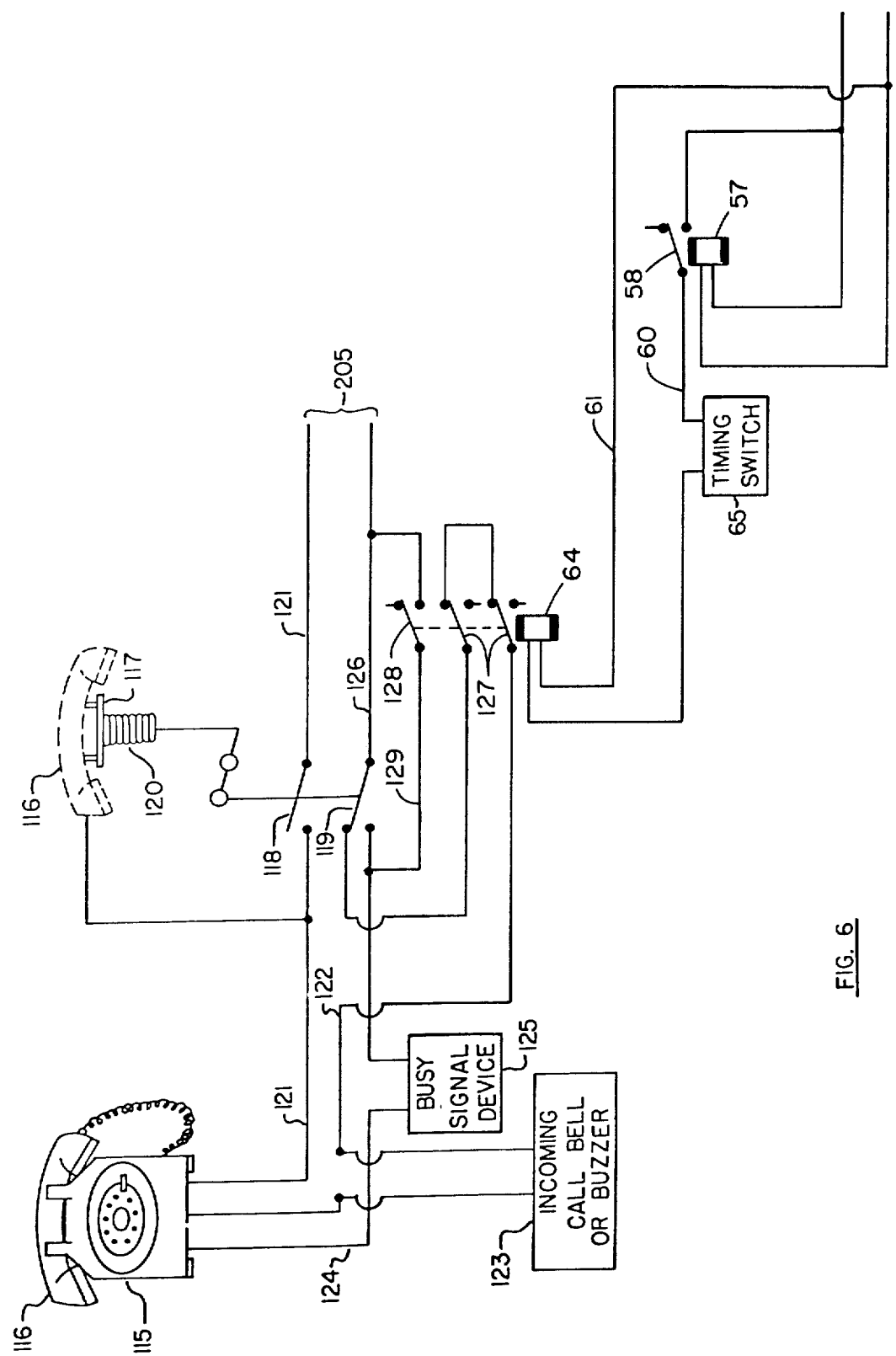
FIG. 6 is a schematic of telephone circuitry to which the detection and alarm system in accordance with this invention may be connected, shown with the handset in place on the body of the telephone and the respective circuit connections in such position.
Figure 7:
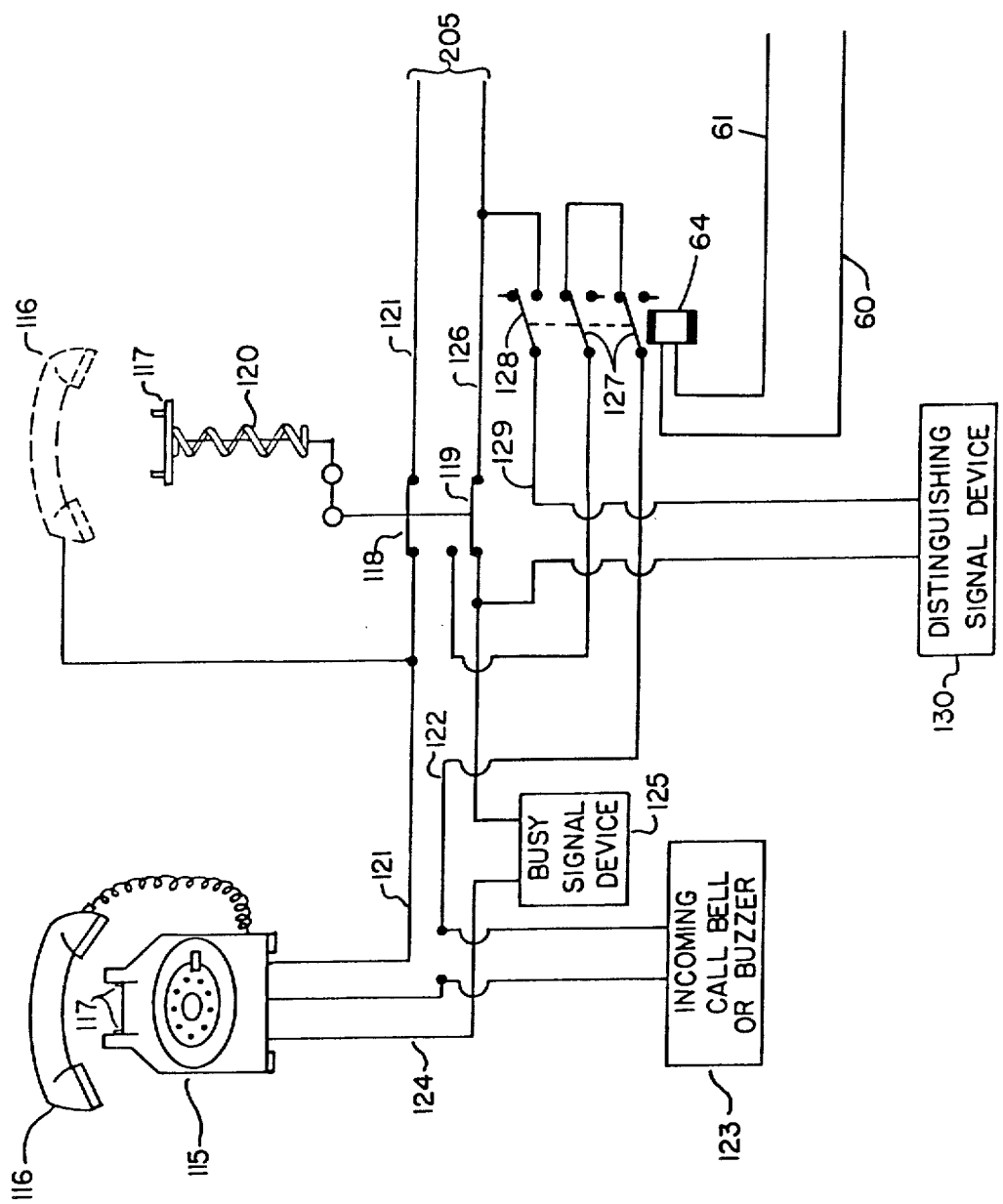
FIG. 7 is a schematic of the telephone circuitry of FIG. 6 shown with the handset removed from the phone and the respective circuit connections in such position, including the addition of a distinguishing signal device to supplement or substitute for a busy signal an occurrence of an abnormal condition detected by the invention described herein.

A telephone incoming call circuit 205 and its sub-circuits for communication between telephones, for ringing a bell or buzzer to announce an incoming call, and for producing a busy signal when the communication circuit is closed are illustrated in FIGS. 6 and 7 to show in greater detail how the sump pump detection and alarm system in accordance with this invention causes a busy signal or other signal, in telephone incoming call circuit 205 when one or more of the abnormal conditions are present at the sump pump location.

A telephone body 115 and handset 116 are shown in FIGS. 6 and 7, and their interior circuits are shown schematically, FIG. 6 illustrating the respective circuits when the phone is not in use and the handset 116 is in place to depress button switch operator 117 moving the respective contacts 118 and 119 to one position, FIG. 7 illustrating the respective circuits when the phone is in use and the handset 116 is removed to allow the upwardly biased switch operator 117 to move contacts 118 and 119 to different positions. Switch operator 117 is biased upwardly by a compression spring 120.

When the phone is in the not in use position with switch operator 117 depressed, contact 118 is in the contact open position to interrupt the communication circuit 121. At the same time contact 119 is moved to a closed contact position with incoming call bell or buzzer circuit 122. In these contact positions, a signal of an incoming call can be transmitted through the call bell circuit 122 to cause the bell or buzzer 123 to ring or make an audible sound at the telephone 115.

When the handset 116 is lifted from the telephone body 115, the switch operator 117 is biased upwardly by spring 120 causing switch 118 to move to the contact closed position in communication circuit 121 whereupon communication can be conducted from the telephone handset 116 through circuit 121 to the telephone from which the call originated. At the same time contact 119 is moved out of contact with the incoming call bell circuit 122 thereby interrupting that circuit causing the bell 123 to stop ringing. In the telephone circuit shown, contact 119 is moved into contact closed position with a "busy signal" circuit 124 when contact 118 is moved into contact closed position with communication circuit 121. At this time, the "busy signal" device 125 becomes energized to transmit a busy signal on circuit 124, and through conductor 126 which is in common with the incoming call bell circuit 122 in the particular telephone circuitry illustrated here.

The connection of the sump pump detection and alarm circuit to an incoming telephone circuit 205 described briefly above, will now be described in greater detail with reference to the particular telephone circuitry illustrated in FIGS. 6 and 7 and described hereinabove.

When relay coil 64 is energized as described above, normally closed relay contacts 127 connected in call bell circuitry 122 are opened to interrupt the incoming call bell circuit 122. The call bell or buzzer 123 can therefore not sound if an incoming call signal is received on conductor 126. At the same time, relay contacts 128 which are normally open are closed when relay coil 64 becomes energized. These contacts are connected through conductor 129 in parallel across contact 119 and its operable switching connection in the "busy signal" circuit 124 and conductor 126. Thus, when relay contacts 128 are closed, a circuit is completed between "busy signal" circuit 124 and conductor 126 to energize the busy signal device 125 and provide a "busy signal" on conductor 126. Thus, an incoming call intended for the telephone 115 whose signal appears on conductor 126 will be met with a busy signal originating from circuit 124 rather than the ringing of the telephone bell or buzzer 123 on circuit 122, in the same manner as if the handset 116 had been lifted from the phone causing contact 118 to close the communication circuit 121, and contact 119 to open connection of the incoming bell circuit 122 to conductor 126 while at the same time closing the connection of the busy signal circuit 124 to conductor 126.

It is understood that telephone circuits may vary, but it is within the scope of this invention to provide an operable connection of the detection and alarm system in accordance with this invention to any telephone circuitry to provide a signal to a caller that an abnormal condition exists at a sump pump location related to the location of such telephone.

The timing switch 65 will alternately open and close the circuit to relay coil 64 as described above, so after a pre-determined lapse of time the busy signal induced by operation of relay contacts 127 and 128 will disappear on conductor 126 enabling the telephone to ring by connection of call bell circuit 122 to conductor 126. Thus, after another pre-determined lapse of time, the timing switch 65 will cause relay contacts 127 and 128 to move to their alternate positions, reintroducing a busy signal on conductor 126.

FIG. 7 illustrates a separate distinguishing signal device 130 connected in conductor 129 which becomes energized when relay contacts 128 are closed by energization of relay coil 64. The distinguishing signal device 130 emits a signal which is readily distinguishable from the usual "busy signal", and it may be selected to produce a signal which is unique to the existence of an abnormal condition at the location in question. When the circuit through conductor 129 is closed to energize distinguishing signal device 130, such inique signal is transmitted to conductor 126 and to any caller who attempts to call the telephone in question while relay contacts 128 are in the closed position indicating the presence of an abnormal condition at the location referred to.

I claim:

1. A detection and alarm system to detect a plurality of different conditions at a sump pump location and to thereupon provide a distinguishing alarm signal for each of such different conditions, comprising a first detecting means to detect a loss of electrical power to said sump pump location and no abnormally high water level condition at said sump pump location, first alarm signalling means to signal the existence of such first condition, second detecting means to detect a loss of electrical power to said sump pump location plus an abnormally high water level condition at said sump pump location, and second alarm signalling means to signal the existence of such second condition.

2. A detection and alarm system as set forth in claim 1, wherein said detection and alarm system includes third detecting means to detect a third condition, third alarm signalling means to signal the existence of such third condition, wherein said third condition is an abnormally high water level condition at said sump pump location but with electrical power still available to said sump pump location.

3. A detection and alarm system as set forth in claim 2, wherein said detection and alarm system includes a first electrical power source to energize a sump pump, a second electrical power source to energize a primary electrical detection and alarm circuit including said primary electrical detection and alarm circuit, said primary circuit comprising said first, second and third detection means, first switch means in said first detection means, second switch means in said second detection means, third switch means in said third detection means, and common energizating means electrically connected to said first power source and operably connected to each of said first, second and third switch means to selectively alternate said first, second and third switch means between respective open circuit and closed circuit positions when power is available at said sump pump location from said first power source and respective opposite positions when power is not available from said first power source at said sump location.

4. A detection and alarm system as set forth in claim 3, wherein said detection and alarm system includes water level detection means to detect the existence of a high water level condition at said sump pump location, fourth switch means in said electrical detection and alarm circuit operably connected to said water level detection means, said fourth switch means also operably connected to said second and third detection means.

5. A detection and alarm system as set forth in claim 4, wherein said first detection means includes a first sub-circuit to detect the presence of said first condition, said first sub-circuit including said first switch means, said first switch means including a first pair of contacts normally biased to the contact closed position and movable to the contact open position upon energization of said common energizing means, a first signal means in said first sub-circuit to signal the existence of said first condition upon occurrence thereof.

6. A detection and alarm system as set forth in claim 5, wherein said first sub-circuit includes a second signal means to signal the existence of any one of said first, second and third conditions upon occurrence thereof.

7. A detection and alarm system as set forth in claim 6, wherein said first signal means is a lamp and said second signal means is an audible alarm device.

8. A detection and alarm system as set forth in claim 6, wherein said first sub-circuit includes first signal defeating means to de-energize one of said first and second signal means without de-energizing the other.

9. A detection and alarm system as set forth in claim 8, wherein said first signal defeating means includes a first by-pass circuit across the said first sub-circuit to short out said second signal means, said by-pass circuit including a manually operable switch to energize said by-pass circuit.

10. A detection and alarm system as set forth in claim 9, wherein said second detection means includes a second sub-circuit to detect the presence of said second condition, said second sub-circuit including said second switch means said second switch means including a second pair of contacts normally biased to the contact closed position and movable to the contact open position upon energization of said common energizing means, a third signal means in said second sub-circuit to signal the existence of said second condition upon occurrence thereof, said fourth switch means being electrically connected in said second sub-circuit.

11. A detection and alarm system as set forth in claim 10, wherein said second sub-circuit includes said second signal means, and an auxiliary conductor circuit leading to said second signal means connected to said second sub-circuit at a junction between said second pair of contacts and said third signal means.

12. A detection and alarm system as set forth in claim 11, wherein said third signal means is a lamp and said second signal means is an audible alarm device.

13. A detection and alarm system as set forth in claim 11, wherein said second sub-circuit includes second signal defeating means to de-energize one of said third and second signal means without de-energizing the other.

14. A detection and alarm system as set forth in claim 13, wherein said second signal defeating means includes a second by-pass circuit, said second by-pass circuit connected in parallel across said second signal means and connected at one end to said auxiliary conductor circuit at a junction between said second signal means and said second pair of contacts, said second by-pass circuit including a manually operable switch to energize said second by-pass circuit, a relay coil connected in said second by-pass circuit, a pair of relay contacts associated with and operated by said relay coil connected in said auxiliary conductor circuit, said relay contacts connected in said auxiliary conductor circuit being moved to the contact open position upon energization of said coil connected in said second by-pass circuit to thereupon interrupt the circuit to said second signal means and thus de-energize said second signal means.

15. A detection and alarm system as set forth in claim 14, wherein said third detection means includes a third sub-circuit to detect the presence of said third condition, said third sub-circuit including said third switch means, said third switch means including a third pair of contacts normally biased to the contact open position and movable to the contact closed position upon energization of said common energizing means, a fourth signal means in said third sub-circuit to signal the existence of said third condition upon occurrence thereof, said fourth switch means being electrically connected in said third sub-circuit.

16. A detection and alarm system as set forth in claim 15, wherein said third sub-circuit includes said second signal means, said third sub-circuit being connected to said auxiliary conductor circuit leading to said second signal means at a junction between said third pair of contacts and said fourth signal means.

17. A detection and alarm system as set forth in claim 16, wherein said fourth signal means is a lamp and said second signal means is an audible alarm device.

18. A detection and alarm system as set forth in claim 16, wherein said third sub-circuit includes signal defeating means to de-energize one of said fourth and second signal means with de-energizing the other.

19. A detection and alarm system as set forth in claim 16, wherein said second signal defeating means which de-energizes one of said third and second signal means without de-energizing the other also comprises the signal defeating means to de-energize said one of said fourth and second signal means without de-energizing the other.

20. A detection and alarm system as set forth in claim 4, wherein said detection and alarm system includes a primary control and monitoring console, said primary electrical detection and alarm circuit being mounted therein, at least one portable remote control and monitoring console for placement at remote locations from said primary control and monitoring console and for connection thereto, and connection means to operably connect said remote console to said primary console.

21. A detection and alarm system as set forth in claim 20, wherein said remote control and monitoring console includes a remote electrical detection and alarm circuit therein, said circuit including a first remote signal means to signal the presence of said first condition, a second remote signal means to signal the presence of any one of said first, second and third conditions, a third remote signal means to signal the presence of said second condition and a fourth remote signal means to signal the presence of said third condition.

22. A detection and alarm system as set forth in claim 21, wherein said first, third and fourth remote signal means are respective first, second and third lamps mounted on said remote control and monitoring console, and said second remote signal means includes an audible alarm device.

23. A detection and alarm system as set forth in claim 16, including a primary control and monitoring console, said primary electrical detection and alarm circuit being mounted therein, at least one portable remote control and monitoring console for placement at remote locations from said primary control and monitoring console and for connection thereto, and connection means to operably connect said remote control console to said primary console.

24. A detection and alarm system as set forth in claim 23, wherein said remote control and monitoring console includes a remote electrical detection and alarm circuit therein, said circuit including a first remote signal means to signal the presence of said first condition, a second remote signal means to signal the presence of any one of said first, second and third conditions, a third remote signal means to signal the presence of said second condition and a fourth remote signal means to signal the presence of said third condition.

25. A detection and alarm system as set forth in claim 24, wherein said connection means includes first connection means to connect said remote electrical detection and alarm circuit to one pole of said second electrical power source of said primary electrical detection and alarm circuit in said primary control and monitoring console, second connection means to connect said first remote signal means to said first sub-circuit of said primary circuit to signal the presence of said first condition, third connection means to connect said third remote signal means to said second sub-circuit of said primary circuit to signal the presence of said second condition, and fourth connection means to connect said fourth remote signal means to said third sub-circuit of said primary circuit to signal the presence of said third condition.

26. A detection and alarm system as set forth in claim 25, wherein said second remote signal means is connected in parallel with each of said first, third and fourth remote signal means to signal the presence of any one of said first, second and third conditions upon occurrence of any one thereof.

27. A detection and alarm system as set forth in claim 26, wherein said detection and alarm system includes a first remote signal defeating circuit to de-energize said second remote signal means with de-energizing said first remote signal means after the occurrence of said first condition.

28. A detection and alarm system as set forth in claim 27, wherein said detection and alarm system includes a second remote signal defeating circuit to de-energize said second remote signal means without de-energizing said third and fourth remote signal means after the occurrence of respective ones of said second and third conditions.

29. A detection and alarm system as set forth in claim 28, wherein said detection and alarm system includes fifth connection means to connect said first remote signal defeating circuit of said remote control and monitoring console to said first by-pass circuit of said primary detection and alarm circuit in said primary control and monitoring console, a first manually operable switch connected in said first remote signal defeating circuit to close and energize said first remote signal defeating circuit to said first by-pass circuit of said primary detection and alarm circuit in said primary control and monitoring console, a first manually operable switch connected in said first remote signal defeating circuit to close and energize said first remote signal defeating circuit to thus de-energize said second remote signal means after occurrence of said first condition, said first by-pass circuit of said primary circuit being also thereby energized when said fifth connection has been made to simultaneously de-energize said second signal means of said primary circuit after occurrence of said first condition.

30. A detection and alarm system as set forth in claim 29, wherein said detection and alarm system includes sixth connection means to connect said second remote signal defeating circuit of said remote control and monitoring console to said second by-pass circuit of said primary detection and alarm circuit in said primary control and monitoring console, a second manually operable switch connected in said second remote signal defeating circuit to close and energize said second remote signal defeating circuit to thus de-energize said second remote signal means after occurrence of said second and third conditions, said second by-pass circuit of said primary circuit being also thereby energized when said sixth connection has been made to simultaneously de-energize said second signal means of said primary circuit after occurrence of said second and third conditions.

31. A detection and alarm system as set forth in claim 20, wherein said detection and alarm system includes a first remote switching circuit in said portable remote control and monitoring console, means to connect said first remote switching circuit to said primary electrical detection and alarm circuit in said primary control and monitoring console to open and close said primary detection and alarm circuit from said remote control and monitoring console.

32. A detection and alarm system as set forth in claim 20, wherein said detection and alarm system includes a second remote switching circuit in said portable remote control and monitoring console, means to connect said second remote switching circuit to said first electrical power source to open and close a circuit from said first power source to said common energizing means of said primary detection and alarm circuit from said remote control and monitoring console.

33. A detection and alarm system as set forth in claim 32, wherein said detection and alarm system includes a remote testing switch in said second remote switching circuit to simulate the existence of at least said first condition when said testing switch is moved to the circuit open position.

34. A detection and alarm system as set forth in claim 3, wherein said common energizing means is the coil of a relay, said coil being connected across said first electrical power source, said first electrical power source being a 110 VAC power source.

35. A detection and alarm system as set forth in claim 19, wherein said detection and alarm system includes a fifth signal means to positively signal the presence of electrical power available from said first power source at said sump pump location, said fifth signal means being energized and operating when such electrical power is so available, and being de-energized and not operating when such electrical power is not so available.

36. A detection and alarm system as set forth in claim 35, wherein said fifth signal means is an electric lamp, said lamp being connected across said first electrical power source.

37. A detection and alarm system as set forth in claim 3, wherein said detection and alarm system includes a main testing switch in said circuit leading from said first electrical power source to said common energizing means, said main testing switch simulating the existence of at least said first condition when said main testing switch is moved to the circuit open position.

38. A detection and alarm system as set forth in claim 3, wherein said detection and alarm system includes a first telephone at a location related to the location of said sump pump, said first telephone including a communication circuit to enable communication from said first telephone to a second telephone when said communication circuit is in the circuit closed state, telephone signal means associated with said first telephone to provide a busy signal when said communication circuit is in said closed circuit state, telephone connecting means to operably connect said communication circuit of said telephone to said primary electrical detection and alarm circuit to transmit a signal to said communication circuit when at least one of said first, second and third conditions is present at said sump pump location and thereupon cause said telephone communication circuit to assume said closed circuit state to in turn cause said telephone signal means to provide a busy signal to anyone attempting to telephonically communicate with and through said first telephone.

39. A detection and alarm system as set forth in claim 38, wherein said telephone connecting means includes a first telephone connecting circuit connected to at least one of said first, second and third detection means of said primary detection and alarm circuit, a relay coil in said first telephone connecting circuit, a second telephone connecting circuit, contact means connected in said telephone connecting circuit operable by said relay coil in said first telephone connecting circuit to move between a contact open and contact closed position, said contact means being moved to said contact closed position when one of said first, second and third conditions are present at said sump pump location and detected by a respective one of said first, second and third detection means causing said relay coil to become energized thereby energizing said second telephone connecting circuit when said relay coil is energized, said communication circuit of said first telephone comprising a first sub-circuit including an audible device connected to announce the presence of an incoming call, a second sub-circuit including a signal device to provide a busy signal, alternating switching means to alternately interrupt said first sub-circuit when said second sub-circuit is completed and to conversely interrupt said second sub-circuit when said first sub-circuit is completed, said second telephone connecting circuit being electrically connected to said alternating switching means to interrupt said first sub-circuit and to complete said second sub-circuit when said relay coil of said first telephone connecting circuit is energized and said second telephone connecting circuit is likewise energized.

40. A detection and alarm system as set forth in claim 39, wherein said detection and alarm system includes timing means to alternately change said telephone connecting means from a connected state to a disconnected state and back again repetitively after respective preselected time intervals.

41. A detection and alarm system as set forth in claim 40, wherein said timing means is an electrical timing switch, and said telephone connecting means to which said electrical timing switch is connected is one of said first and second telephone connecting circuits.

42. A detection and alarm system as set forth in claim 3, wherein said detection and alarm system includes a radio transmitter, transmitter connecting means to operably connect said radio transmitter to said primary electrical detection and alarm circuit to transmit a signal to said radio transmitter when at least one of said first, second and third conditions is present at said sump pump location to thereupon cause said radio transmitter to transmit radio wave signals indicating the presence of at least one of said conditions.

* * * * *